. United States Patent [19]

Dougherty

[11] Patent Number: 4,679,600
[45] Date of Patent: Jul. 14, 1987

[54] HIGH TENSILE STRENGTH REMOVABLE HOSE COVERING

[75] Inventor: Robert C. Dougherty, Tucson, Ariz.
[73] Assignee: Durodyne, Inc., Tucson, Ariz.
[21] Appl. No.: 774,019
[22] Filed: Sep. 9, 1985
[51] Int. Cl.[4] ............................................. F16L 11/08
[52] U.S. Cl. ..................................... 138/128; 138/178
[58] Field of Search .................. 24/31 B, 31 F, 31 V, 24/31 W, 33 K, 35, 36, 519, 588; 138/99, 110, 121, 125, 128, 151, 158, 168, 178; 150/52 F, 52 H, 52 R; 174/136, DIG. 11; 428/192; 405/184; 474/255

[56] References Cited

U.S. PATENT DOCUMENTS

| 767,767 | 8/1904 | Ruegg | 150/52 R |
|---|---|---|---|
| 2,059,511 | 11/1936 | Engelman | 150/52 FX |
| 2,120,301 | 6/1938 | Tishman | 138/128 X |
| 2,532,587 | 12/1950 | Williamson | 138/149 |
| 2,814,845 | 12/1957 | Hjort | 24/33 K |
| 3,030,250 | 4/1962 | Losse | 138/149 |
| 3,060,069 | 10/1962 | Sindais | 174/136 |
| 3,583,424 | 6/1971 | Bryant | 138/121 X |
| 3,638,286 | 2/1972 | Eichberg | 138/128 X |
| 3,655,445 | 4/1972 | Yamato | 138/110 X |
| 3,981,340 | 9/1976 | Anderson et al. | 150/52 R |

FOREIGN PATENT DOCUMENTS

| 663750 | 7/1938 | Fed. Rep. of Germany | 24/33 K |
|---|---|---|---|
| 2745506 | 4/1979 | Fed. Rep. of Germany | 138/99 |
| 1211432 | 3/1960 | France | 24/31 W |

Primary Examiner—Stephen Marcus
Assistant Examiner—Mark Thronson
Attorney, Agent, or Firm—J. Michael McClanahan

[57] ABSTRACT

A high tensile strength and high abrasion resistant removable hose covering and method of construction is described for fabricating a reusable, removable hose covering adapted to surround an inner hose by which high tensile strength in the longitudinal direction may be imparted to the combination of the inner hose and removable hose covering and in addition, extreme high resistance to environmental abrasion is obtained. The inner hose is constructed by conventional methods. The removable hose covering is constructed by firstly locating a hooking type separable closure mechanism on opposite sides, placing under tension parallel high tensile strength longitudinal cables between the closure mechanisms, encompassing the longitudinal cables with elastomeric hose materials, placing under tension transverse hose reinforcement materials between the separated closure mechanisms, adding additional layers of elastomeric materials as needed covering the transverse hose reinforcement, adding a hose covering material, and finally vulcanizing the elastomeric materials of the removable hose covering. The removable hose covering is placed around the inner hose, the closure mechanism engaged, and the combination held between two distant points. The longitudinal cables provide both the high tensile strength and the extreme resistance to environmental abrasion and damage.

19 Claims, 7 Drawing Figures

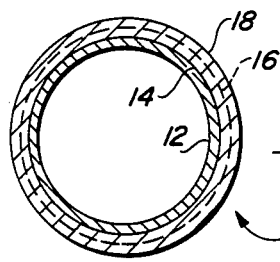
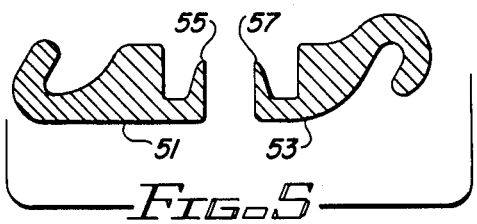
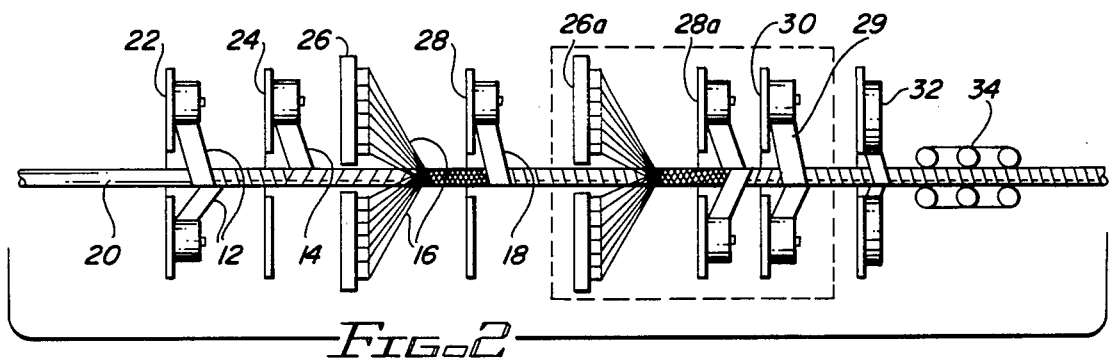
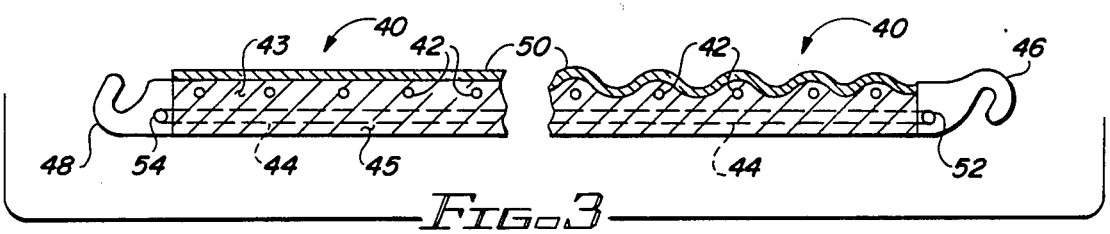
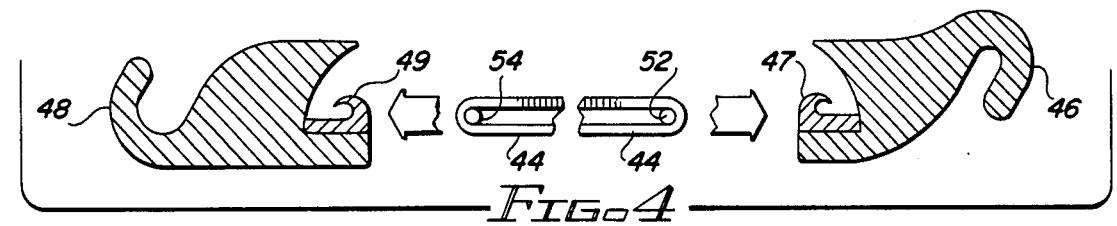
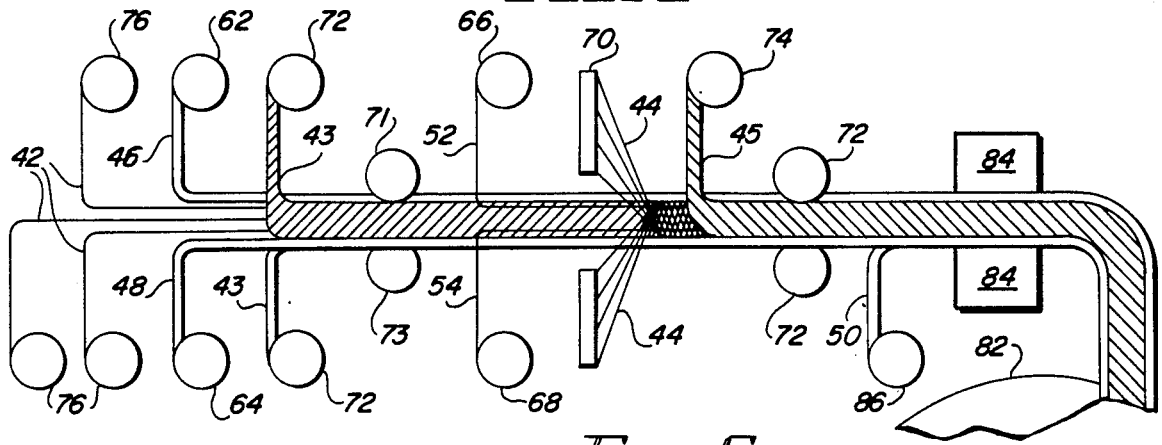
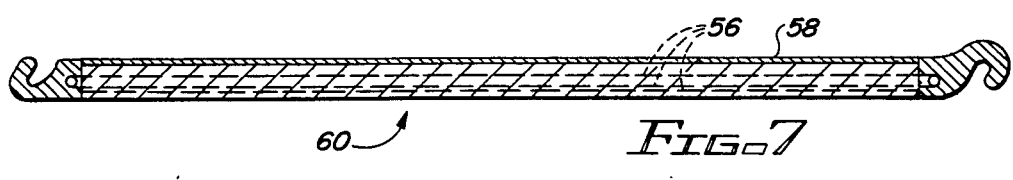

HIGH TENSILE STRENGTH REMOVABLE HOSE COVERING

BACKGROUND OF THE INVENTION

Hose can best be described as a flexible pipe. Its purpose is to contain and transmit fluid from one location to another safely. Fluids include liquid, gas, solids in a fluidic state and combinations of these catagories. Hose has advantages over pipe inasmuch as it is flexible, it absorbs vibration, it may handle corrosive fluids, it comes in a great variety of sizes, it is sound dampening, and it is easily stored.

Hose is constructed of three basic elements, (1) the tube or inner liner which is the element which contains, conveys, and resists the fluid inside. It transmits the forces created by internal pressure of the fluid to the strength member of the hose; (2) the reinforcement or strength member of the hose, commonly referred to as "hose reinforcement", reacts to and resists the forces of the fluid pressure, commonly called "hoop strength"; and (3) the cover which protects the hose reinforcement from physical damage and resists the external environment.

Materials used to construct the tube or inner liner and the cover consists of, in the most common cases, rubber or plastic, while the hose reinforcement usually comprises yarns, fabrics, and metals in the form of filaments, wires, fabric, braid, sprials, etc. Rubber is used in its broad sense including all elastomeric materials—natural, synthetic, and compounds and structures thereof, while plastics include the wide spectrum of thermoplastic materials. The hose reinforcement includes materials made from cotton, synthetics, or combinations thereof, and metals including steel, copper, aluminum, and platings thereon such as zinc, brass, cadmium, and tin.

Available today are a wide range of basic elastomers to choose from, and many types can be blended together in almost unlimited combinations to obtain different properties. Common rubbers available are neoprene, natural rubber, polyisoprene butyl, nitrile, SBR, hypalon, ethylene, propylene, chloronated polyethylene (CPE), fluorocarbons, epichlorohydrin, and epichlorohydrin/ethylene oxide. Examples of thermoplastic materials include polyvinyl chloride (PVC), polyethylene (PE), nylon, polyester, polyurethane (TPU), and EVA. In addition, fibers commonly used in hose construction comprise cotton, rayon, glass, nylon, polyester, asbestos, fiber B, and nomex nylon.

The five basic types of hose reinforcements are identified by the method of manufacture or application over the inner tube or liner. These five types are braid, spiral, wrapped ply, loom, and knit. In braiding, a braid is formed by interweaving cords while they are being applied in a helical spiral over the tube. One-half of the cords are spiraled right-hand, and the other left-hand. The most common hose braiding machines weave cords in a two-over, two-under pattern. When multiple plies are braided, it is important to obtain proper adhesion between plies as well as to the tube and cover. Adhesion is usually obtained by the use of a thin layer of tie gum, often called friction, or by a dough or cement application in and around cores of the braid. Spiral reinforcement is applied in separate plies. The first ply may be laid in a left or right hand spiral and second ply then laid in an opposite spiral. Successive plies are applied in a similar manner, each ply separated by a tie gum layer or dough adhesive. Wrapped ply reinforcement of a woven fabric is often used as hose reinforcement, either as a series of multiple plies, or in conjunction with a spiral wire. The fabric is prepared by a calendering or coating the fabric with rubber compound, i.e., tie gum, which enables the fabric to adhere to adjacent plies, to the tube, and to the cover. In addition, the tie gum may first be applied to the tube and then wrapped with the woven fabric. Loom reinforcement of hose is made with cords wound at a closed circular pitch while longitudinal (wrap) yarns are interwoven with the circular wound cords. Knit reinforcement of both is accomplished by applying reinforcing yarns over the tube in a circular knitting machine. Variations of the knit pattern include a plain knit, lock-stitch, or wrap knit.

For more extensive information, the reader is referred to the publication HOSE HAND BOOK, RUBBER MANUFACTURERS ASSOCIATION, 1901 Pennsylvania Avenue, Washington N.W., D.C. 20026 (1979).

The inner tube or liner must be firm enough in the unvulcanized state to resist deformation and stretch under normal processing conditions described above. When the tube is too thin or too soft to withstand subsequent processing, or when the internal diameter must be kept within a narrow range, it is supported on a mandrel. The mandrel is usually as long as the hose to be made and has a round or other cross-section as desired.

In many cases, hoses utilized for pressurized liquids are wrapped with hose reinforcement applied under tension and the material chosen for the inner tube is not sufficiently firm to resist deformation and stretch and therefore must be vulcanized prior to application of the tie gum and hose reinforcement. In addition, many times the inner tube must be supported on an internal mandrel during this method of processing. The present state of the art in constructing hose for pressurized liquids is to employ a mandrel at least as long as the hose to be made, the mandrel being removed either before or after vulcanization of the tie gum and hose cover. If the mandrel is removed prior to the final vulcanization, the interior of the hose is supported during vulcanization by fluid under pressure.

Because of the problems that are inherent in removing the mandrel from a completed hose (before or after final vulcanization), hose length has been limited in construction to lengths which can be physically handled during processing and where the mandrel can be removed without substantial danger of harming the hose.

Hose made by the processes above described perform the function of resisting forces of fluid pressure which might result in the hose bursting by having a great hoop strength. However, there arises occasions where it is necessary that the hose exhibit high tensile strength, i.e., strength in its longitudinal direction and under some circumstances, extreme resistance to outside abrasion and damage.

Possible application of hose requiring high tensile strength are use of hose in deep undersea mining where the hose serves both to convey minerals recovered from the seabed and to tow a sleigh which gathers the minerals for conveyance to the surface. In addition, the unsupported stretching of hose for long distances such as between ships at sea during refueling requires that the hose utilized exhibit high tensile strength, both for its own weight and the weight of the fuel interior to the hose, and to prevent the hose from separating if the two ships pull apart. Hoses exhibiting high tensile strength for such refueling application perform a dual function, that of keeping the ships together, and preventing the breaking of the hose line and aborting a successful transfer of fuel.

Further, high tensile strength hose is useful for ship to shore liquid unloading where, in addition to the high tensile strength necessary, the hose cover must be highly resistant to abrasion caused by coral reefs, sand, surf, and the like. The longitudinal load imposed on the hose would be due to wave motion, currents, wind, tide, possible drifting of the ship, and the like.

In addition, there are situations where the qualities of high tensile strength in the longitudinal direction and high resistance to abrasion and damage are necessary such as if the hose were employed as a float-sink hose, i.e., the hose is designed to float while empty and then sink when filled with fluid, such as might be used in an installation between ship and shore, the hose being subjected to possible damage if struck by foreign objects, such as a passing ship. In such a case, if the hose could closely approach characteristics of an armour plated hose and still remain flexible, it is obvious that there would be much use.

In addition, it would be useful if the high tensile strength member of the hose were such that it could readily be separated from the hose for situations where it is no longer needed, or due to bulkiness in transportation or in storage, the inner hose and the outer covering could be shipped and stored separately. An example of use of the above separable hose and hose covering would be in temporary suspending of hose between two points until permanent support is provided at which time the outer supporting cover of the hose is removed and the hose theretofore within the covering be supported by the later constructed supporting member.

Further, by the combination of an inner hose and an outer, removable hose covering, ultra light inner hoses may be utilized, possibly even without hose reinforcement in the inner hose, by placing the hose reinforcement in the high tensile strength removable hose covering.

It is to these ends that the subject invention is directed, i.e., to present an invention and method of construction of a hose which exhibits high tensile strength as well as abrasion or damage resistance and is separable into two components, an inner hose for conveying the fluid and an outer removable, reusable high tensile strength hose covering.

SUMMARY OF THE INVENTION

The present invention provides a high tensile strength hose with added abrasion and damage resistance which is separable into an inner hose and a reusable and removable hose covering. Firstly, the inner completed hose is fabricated by conventional methods, for example, that of having an inner liner or tube formed on a mandrel utilizing an elastomeric or plastic material designed to be resistant to the fluid which the hose is proposed to convey. If the inner hose is to have some reinforcement, then following the inner liner, a layer of plastic, cement, or elastomeric material such as tie gum is placed upon the inner liner covering the mandrel, the layer of tie gum followed by a layer of hose reinforcement of appropriate choice. The hose reinforcement is designed to resist the fluidic pressure of the fluid interiorly to the hose and may be fabricated by any one of the known previously discussed methods. Following the layer of hose reinforcement, a layer of tie gum material is laid upon the uncompleted hose. Following this step, alternate layers of hose reinforcement and tie gum may be added if needed, or depending on the application, a final layer of hose covering may be placed over the tie gum layer.

Alternately, if the removable hose covering is to provide the requisite hoop strength, hose reinforcement of the inner hose may not be necessary and the above steps omitted. The inner hose may or may not be covered with a hose covering, depending upon anticipated exposure. If it is anticipated that the removable second component of Applicant's invention is to always be present upon the completed inner hose, or if the environment that the inner hose is going to be exposed to is sufficiently resisted by cured tie gum, it may not be necessary to add a hose covering to the inner hose, but the tie gum material may be all that is necessary. The inner hose, with or without the hose covering, is then vulcanized in an appropriate and usual manner.

Following construction of the inner hose, the high tensile strength removable hose covering is fabricated. This removable hose covering is fabricated with similar materials as used in hose construction in the preferred embodiment, however, means must be provided by which the hose covering can be removed, and means by which high tensile strength in the longitudinal direction may be imparted. Both objectives are accomplished in Applicant's invention. In constructing the removable hose covering, the covering is fabricated while laying in a flat position, the covering to later encompass the inner hose when utilized.

The removable hose covering is fabricated by firstly laying down the separable closure mechanism which holds the two sides of the hose covering around the inner hose. One/half of the closure mechanism is located on one side of the line, and spaced apart from it will be the other half of the closure mechanism to form essentially two parallel lines. Between these two parts of the closure mechanism, are laid at least one, and in most cases, a plurality of longitudinal cables, such as steel, stainless steel, Kevlar, or nylon, the cables lying parallel to the lines of the closure mechanism. Then, a first layer of hose elastomer material is laid in a layer running parallel to the closure mechanism and longitudinal cables encapsulating the cables within the material layers and engaging the inside portion of each half of the closure mechanism. Following the application of the elastomeric materials over the longitudinal cables, hose reinforcement material is placed substantially transversely to the longitudinal direction of the resultant removable hose covering. This hose reinforcement material may be placed upon the previously laid down layer of elastomeric material in any form desired, either in a pattern which is exactly 90° to the longitudinal direction of the removable hose covering, or in a pattern similar to spiraling. In addition, the hose reinforcing material may, at the option of the fabricator, be physically attached to each side of the closure mechanism by encircling an upward protruding finger, or it may just be laid down adjacent to the closure mechanism halves, or to overlap an underlying finger of the closure mechanism which may extend inwardly to the removable hose covering.

As in manufacturing of hose, the hose reinforcement material is stretched under tension as it is placed from side to side on the previously laid down elastomeric material. One obvious method of accomplishing placing the hose reinforcement material under tension is to attach it on each side to each half of the closure mechanism. After the hose reinforcement material is laid across the removable hose covering, another layer of tie gum or other elastomeric material is laid down over the hose reinforcement to encapsulate it much as is accomplished in hose fabrication.

Successive alternate layers of tie gum material and hose reinforcement and, if necessary or desired, longitudinal tensile strength cables are emplaced until the removable hose covering has been fully constructed having the desired longitudinal tensile strength and transverse hoop strength. At that time, the portion of the hose which has received all the materials is vulcanized by placing a portion of the removable hose covering in a so-called belt press, the belt press pressing on the top and the bottom of the removable hose covering while simultaneously applying heat to vulcanize and cure the elastomeric materials which binds all the components together into a solid, but flexible mass.

By the application of pressure upon the belt, entrained air bubbles are not permitted to expand during the heating process such as to provide points of specific weakness in the removable hose covering. The above fabrication process, from laying down the tie gum materials over the longitudinal cables, laying down the hose reinforcement, then additional layers of tie gum materials, and finally the curing or vulcanization of the tie gum materials is repeated along the total length of the removable hose covering.

The top of the covering may take a corrugated configuration, rising up and over the embedded cables and falling in between cables, or additional tie gum may be added to fill in the troughs and the top surface flattened. Lastly, a suitable covering is laid upon the surface of the hose covering which is to be exposed to the environment and to be resistive to abrasion.

In construction, the longitudinal high tensile cables may be placed above or below the hose reinforcement material, or may be placed both above and below the hose reinforcement material.

The closure mechanism, which runs along the total length of the removable hose covering, is any suitable closure mechanism which can comprise, for example, a simple hooking mechanism with two crooked elongated fingers hooking over each other. The closure may be continuous closures down each side of the hose covering, or it may be individual separate closures next to each other running down each side.

The high tensile strength longitudinal cables are secured at each of the removable hose covering by attachment to a hose coupling, or to a stationary standard.

It is an object of the subject invention to provide hose having high tensile strength in the longitudinal direction.

It is another object of the subject invention to provide a hose having high tensile strength in a longitudinal direction wherein the member of the hose providing the high tensile strength is removable.

It is still another object of the subject invention to provide a reusable and removable hose covering which will provide high tensile strength in the longitudinal direction to an existing hose.

It is still further another object of the subject invention to provide a method to fabricate a removable hose covering which provides high tensile strength in the longitudinal direction.

It is still further another object of the subject invention to provide a removable and reusable hose covering which provides transverse hoop strength and high tensile strength in the longitudinal direction.

It is still another object of the subject invention to provide a method of fabricating a removable hose covering providing high tensile strength in the longitudinal direction and hoop strength in the transverse direction.

It is still further another object of the subject invention to provide a removable, reusable hose covering providing extreme resistance to environmental abrasion and damage to the hose covering.

Other objects of the invention will in part be obvious and will in part appear hereinafter. The invention accordingly comprises the construction and the method of construction combining the elements and arranging the parts which are exemplified in the following detailed disclosure and the scope of the application of which will be indicated in the Claims.

BRIEF DESCRIPTION OF THE DRAWINGS

For further understanding of the nature and objects of the present invention, reference should be had to the following detailed description taken in connection with the accompanying drawings wherein:

FIG. 1 is a cross-sectional view of a typical construction of the inner completed hose;

FIG. 2 is a block diagram illustrating a typical fabrication process of the inner hose;

FIG. 3 is a cross-sectional view in partial section of two embodiments of the high tensile strength removable and reusable hose covering;

FIG. 4 is a cross-sectional view of the closure mechanisms and the transverse hose reinforcement of the high tensile strength removable hose covering;

FIG. 5 is a cross-sectional view of another closure mechanism;

FIG. 6 is a block diagram illustrating the method of fabrication of the reusable, removable hose covering; and FIG. 7 is a cross-sectional view of an alternate embodiment of a removable hose covering.

In the various views, like index numbers refer to like elements.

DETAILED DESCRIPTION OF THE PREFERRED EMBODIMENT

Referring now to FIG. 1, a cross-sectional view of an ultra lightweight single braid inner hose 10 utilized in the invention is shown. Because of obvious advantages, the preferred inner hose is designed to be an extremely lightweight hose, perhaps not much more than a tube with enough reinforcement to keep it from being damaged while in storage or transit absent its removable cover. This hose would weigh very little, perhaps 1½ pounds per foot in a 7 or 8 inch inside diameter, and when collapsed for storage, would be practically flat. It is conceivable that 30,000 to 50,000 feet could be stored on a large reel. The hose could be made into 500, 1000, or 1500 foot lengths, whatever would be convenient.

The inner hose, if it is to have no layers of reinforcement, or one or more layers, may be made by standard, well known methods of hose manufacturing having the usual material layers which comprise inner hoses, such as, for example, in referring to FIG. 1, the inner tube or liner 12, a material layer 14 such as a rubber or plastic, tie gum being the most commonly used material, the reinforcement layer 16, and the outside tie gum layer 18.

The reinforcement layer 16 may take the form of an interwoven braid, a continuous spiral, or interwoven left and right sprial, each of one or a plurality of individual cords or strands of reinforcement material. Hereafter, if reference is made to the reinforcement layer as "reinforcement braiding", it is to be known that the particular pattern of the reinforcement layer may take any one of the various forms, and is not confined to a braid-type weave. The inner hose 10 shown is a complete hose after being cured by vulcanization. The inner hose shown in FIG. 1 and described above has not, however, been fitted with the normal and usual protective cover designed to protect the hose from its outside environment, or abrasion and wear.

The inner hose 10, as stated above, is constructed from the standard hose manufacturing machines by conventional methods such as shown in FIG. 2 comprising, from left to right, firstly the mandrel 20, the inner liner applicator 22 which rotates around the moving mandrel to wrap a layer of the tube or inner material 12 upon the mandrel. Shown in FIG. 2 is a "double head" type tube applicator 22. Following the application of the inner liner material 12, a layer of tie gum 14 is circularily wrapped upon the inner liner layer 12 by means of a "single head" tie gum applicator 24. Following the application of the tie gum 14, braider 26 wraps hose reinforcement strands 16 upon the tie gum layer 14. The particular resultant pattern of the reinforcing material 16 may be varied as desired. Braider 26 may wrap a plurality, as many as 64 or more, of interwoven strands. Most commonly today, half are wound from the left hand, and half from the right hand. Other types of hose reinforcement may be laid down, such as using one or a plurality of circular or helical strands. As indicated above, if a lightweight inner hose is desired and the majority of the hoop strength is to be in the removable hose covering, only a minimum or no amount of reinforcement may be employed.

Following the application of the hose reinforcement material 16, another layer of tie gum 18 is applied to the uncompleted hose by means of applicator 28 which is identical to the single head tie gum applicator 24. This completes the fabrication of a single reinforcement layer inner hose 10 and the only steps remaining are the steps of wrapping the inner hose for the vulcanization, and finally, the vulcanization. If, however, additional layers of reinforcement material were wished to be added to the inner hose 10, provisions for doing so is shown in the dotted rectangle where braider 26a is shown placing the braided reinforcement material upon the inner hose 10 followed by tie gum applicator 28a. Still further, if it were desired to place a hose covering upon the inner hose 10, an applicator for the covering material, which is a machine like the previously mentioned applicators, would follow tie gum applicator 28a such as also shown within the dotted rectangle. In the dotted rectangle is shown a "double head" hose covering applicator 30 applying the hose covering material 29.

Continuing on, a nylon wrap is applied to the top layer of tie gum 18 by means of the nylon wrap applicator 32 which wraps two layers of nylon cloth tightly upon the tie gum layer 18. Following the nylon wrap applicator 32 is the caterpillar track take-off 34, commonly called a "cat take-off", which grasps the completely fabricated inner hose, still on the mandrel, between two parallel opposed tracks and pulls the mandrel with its covering through the various processes outlined previously. The completely fabricated inner hose, still retaining its mandrel 20, is then directed to the vulcanizer which applies heat to the inner hose to cure the elastomeric tie gum materials. In vulcanizing, heat may be applied from the outside to cure the hose from the outside in, or heat may be applied internally to mandrel 20 by the introduction of steam, in which case the hose will be cured from the inside out. Not to be left undone, of course, the hose may be cured from the outside and inside simultaneously. After the hose has remained sufficiently long within the vulcanizer, the hose will effect a complete cure. The mandrel prevents the hose from collapsing or shrinking in diameter smaller than the mandrel size due to the tension placed on the hose by the hose reinforcement, and the nylon outer wrap holds the material so that the outside diameter does not enlarge excessively which might be due to heat expanded entrapped air bubbles. After the elastomeric materials have cured, the nylon wrap is removed from the inner hose by unwinding it, and the mandrel is pushed out of the hose by applying pressure behind the mandrel and lubrication forward of the mandrel. Generally utilized is a soapy water mixture as a lubricating fluid and air pressure as a pressurizing method.

As indicated above, many times it may be desirable to utilize one continuous length of inner hose unbroken by connectors or couplings where various lengths of hose are joined. In the method of manufacturing hose as detailed above, hose length is many times limited by the length of the mandrel which must be removed from the hose without the hose being destroyed. Conventional technology limits hose construction to approximately 500 feet lengths. Applicant, however, has devised a method of fabricating long lengths of hose utilizing an internally moving mandrel, and such method is described in Applicant's U.S. Pat. No. 4,488,921, issued Dec. 18, 1984, and such method may be used to make the inner hose of extremely long lengths.

Proceeding now to FIG. 3, a cross-sectional view of the inventive high tensile strength removable hose covering 40 is shown. Immediately noticeable is the manner by which the high tensile strength which characterizes the hose covering is imparted, namely the longitudinally running high tensile strength steel cables 42. These cables, which may be made of stainless steel or any other materials which exhibits high tensile strength, such as steel, Kevlar (a trademarked material of DuPont), or Nylon, are embedded into the elastomeric material 43 of the removable hose covering. In this specification, the terms "hose material", "elastomeric material", or "tie gum" will be used interchangable and all terms refer to elastomeric or thermoplastic materials commonly used in the construction of hose. The cables shown are parallel and run the entire length of the hose covering, secured at each end by appropriate holding or coupling methods.

FIG. 3 also shows, in partial sectional view, two different embodiments of finished construction.

It is desired that the removable hose covering 40 not only possess high tensile strength in the longitudinal direction, but also have tensile strength in the transverse direction, commonly called hoop strength, to resist fluid pressure. The obvious purpose of this is the same reason that hose reinforcement layers are embedded in the hose construction previously described, i.e., to permit the pressurized conveyance of fluids through the hose. In order to efficiently impart hoop strength to the removable hose covering to prevent bursting of the hose under high pressure, the hose reinforcement materials 44 must of necessity be embedded in the removable hose covering materials as part of the device's manufacture. The hose reinforcement materials 44 attach, in the preferred embodiment shown, to closure mechanism 46 and 48 on opposite sides of the removable hose covering 40. Lastly, outside hose cover 50 is detailed.

It is to be noted that the hose materials such as tie gum, when cured, also contribute to the hoop strength of the removable hose covering 40 as it does also in common hose. The addition of hose reinforcement, however, greatly enhances the hoop strength.

The method of manufacturing the removable hose covering 40 is to firstly situate on opposite sides of the assembly line the hose closure mechanism, namely closure catch 46 and closure receiver 48. Closure catch 46 and closure receiver 48 are so configured that on the portion opposite each clasping and holding mechanism, means are incorporated to receive and secure the transverse reinforcement material 44. One of the ways this may be easily accomplished is by the closure mechanism holding two parallel longitudinal cables or rods 52 and 54 on opposite sides of the removable hose covering, the cables adapted to be encircled around their circular diameter by loops of the transverse reinforcement materials 44, and then the cables to be held in spaced apart configuration by hooks or other means in the ends of the closure mechanisms.

An example of the hooks incorporated into the closure mechanism for securing at intervals the longitudinal cables are shown in FIG. 4. Here each part of the closure mechanism has an outstanding hook 47 or 49 to engage the longitudinal cables 52 or 54 shown in position with transverse reinforcement materials 44 wrapped under tension from cable to cable.

While the discussion above centered on the relationship of the reinforcing material and the hooks 47 and 49 incorporate into the closure mechanism, in fabricating the removable hose covering, the parallel longitudinal high tensile strength cables 42 are laid down between the separated closure mechanism catch 46 and receiver 48 and the first layer of surrounding hose material such as a plastic or rubber, tie gum being the most commonly used material, placed atop the longitudinal cables 42. It may be helpful to envision the hose covering 40 to be assembled in an upside-down position from that shown in FIG. 3 wherein the removable hose would be supported horizontally on the side which is to eventually receive the hose covering material 50. In such upside-down configuration from that shown in FIG. 3, the tie gum material 43 which surrounds the longitudinal high tensile strength cables may be a single layer of tie gum material with the longitudinal cables pressed into it, or may comprise a plurality of layers on both sides of the longitudinal cables 42. In either case, the tie gum material 43 will extend on both sides right up to the closure machanisms 46 and 48, which upon curing, will bind the tie gum material to the closure mechanism. Following the surrounding of the longitudinal cables by tie gum material, the hose reinforcement material 44 is wrapped around longitudinal cables or rods 52 and 54, under tension, and then the cables 52 and 54 placed around hooks 47 and 49 respectively, or the cables 52 and 54 may already be around hooks 47 and 49 when wrapped with reinforcement materials 44. At this point in time, the reinforcement materials 44 are under tension, supported between the two opposite ends of the closure mechanism. Following the placement of the reinforcing material between the closure mechanisms, additional layers of tie gum material or other elastomeric material 45 is laid on top of the wraps of transverse reinforcement material 44. It may be necessary at that point to place pressure upon the tie gum materials 45 to push the material through the reinforcement layers to join with the tie gum material 43 which was earlier placed covering the longitudinal high tensile strength cables 42.

Additional layers of tie gum material may be added to the top surface of the removable hose covering, remembering that the removable hose covering is upside-down from its position shown in FIG. 3 and that the tie gum material added to the top of the hose covering during this time of fabrication will actually be the material which will reside next to the inner hose. After sufficient tie gum material 45 has been added to the removable hose covering 40, the only material left remaining is that of the cover material 50 which is added then to the underside of the still upside-down removable hose covering 40. This protective hose covering material 50 is designed to protect the invention from the environment, abrasion, damage, and the like.

Extreme resistance to abrasion, and the environment, is provided by the combined hose covering 50 and the longitudinal high tensile strength cables 42. It is not difficult to envision a situation where the invention might be situated in a ship to shore fuel unloading operation where the cable, running from the ship, will lie on the ocean floor, coming up on the beach to the inland storage facility. The hose could well be passing through a bed of coral reef and as such, subjected to extreme abrasion and cutting. In this situation, the coral can abraid and cut the outer cover 50, however, in doing so will soon meet longitudinal cables 42 which, being of stainless steel or other hard metal, will preserve the integrity of the hose. The only damage will be that portion of the outer cover 50 which was cut or scraped off by the coral until the coral met the stainless steel cables. It is envisioned that there may be a large number of spaced apart parallel longitudinal cables 42 incorporated into the removable hose covering 40 providing the resistance to abrasion. Thus, the hose will take on characteristics similar to an armored cable in terms of resistance to abrasion, cuts, and other environmental dangers.

Finally, the fabricated removable hose covering 40 has the tie gum or other elastomeric materials cured by vulcanizing which binds everything into one solid mass. It may be necessary to lay down nylon wrap or other material on both sides of the hose covering prior to vulcanization and curing. The removable hose covering may be cured by placing it in a press while applying heat to the tie gum materials. Heat may be applied by placing the combination, including the press, in an oven, or by heating the surfaces of the press.

As indicated earlier, the corrugated surface covering each individual longitudinal cable as described on the right hand portion of FIG. 3 may be accomplished during the fabrication of the hose covering by pressing the tie gum material around the longitudinal cables or, as in the left hand side of FIG. 3, additional tie gum material may be added to give a smooth outer surface. Obviously, if the corrugated finish is desired, the necessary troughs and swells must be added to the surface of the press to correspond with the resultant surface of the hose covering.

Pressure is necessarily applied through the press to prevent any entrained air bubbles from expanding during the heating and curing process which might tend to disrupt the integrity of the hose covering.

While it is anticipated that the closure mechanism is to run the full length of the removable hose covering, it may be desired to section the closure mechanism, i.e., each portion of the closure mechanism would be a defined length although the closure mechanism generally would extend the total length of the removable hose covering with gaps inbetween, much like the common zipper mechanism except that each side would meet the other for the lockable portion. Of course, longitudinal cables 52 and 54 should not be sectioned, although it could be possible to section them along with the closure mechanism. As mentioned earlier, hooks 47 and 49 would be discrete elements spaced along the length of the closure. The reason for this is that should the hooks 47 and 49 be continuous like the closure portions, the hose reinforcement material 44 would have no clear path to make a continuous wrap side to side between the longitudinal cables 52 and 54.

Another embodiment of an alternate enclosure mechanism is shown in FIG. 5 where both catch 51 and receiver 53 have upward protruding fingers 55 and 57 respectively to receive and hold the different strands of hose reinforcement material as well as the hose materials which will overlap the fingers. Preferably, fingers 55 and 57 are individual fingers, closely spaced, running the entire length of the closure mechanisms 51 and 53.

It is obvious from the above description that the removable hose covering may be assembled in one continuous operation wherein many individual steps are being applied simultaneously at various points along the production line to fabricate the hose covering while the hose covering is moving along the assembly line. For example, referring to FIG. 6, an assembly line for manufacturing the inventive removable hose covering 40 by the method described is shown. Proceeding from left to right, high tensile strength longitudinal cables 42 are first laid down upon the assembly line, longitudinal cables 42 being unreeled from reels 76, the other end of the cable being taken up in the completed removable hose covering at the completed end of the assembly line, hereinafter discussed. As earlier mentioned, these longitudinal cables are under tension during the period o fabrication which may be accomplished by restraining reels 76. Following longitudinal cables 42, the closure mechanism which is divisible in two pieces, namely closure catch 46 and closure receiver 48, are stored and unreeled from reels 62 and 64 respectively on to the asssembly line at positions parallel to and outside of the parallel longitudinal cables 42. Following the closure mechanism being laid down, a layer of tie gum material 43, stored and unreeled from reel 72, is laid on the top of and immediately below longitudinal cables 42 between the closure mechanisms 46 and 48. This tie gum material is pressed around the longitudinal cables 42 to insure complete coverage of the cables by the tie gum material and to prevent the entraining of air bubbles. This is accomplished by rollers which engage the top and the bottom of the removable hose covering, shown diagramically by Numbers 71 and 73. Following the application of the tie gum material 43 about the longitudinal cables 42, the hose reinforcement material is laid transversely across the removable hose covering from each side. If it is desired that the transverse hose reinforcement material should be attached to each of the closure mechanisms' catch 46 and receiver 48, and utilizing the construction described in FIG. 4, longitudinal rods or cables 52 and 54 unreeled from reels 66 and 68 respectively are placed alongside the already laid down closure mechanisms 46 and 48. Following the two longitudinal cables 52 and 54, wrapping machine 70 wraps hose reinforcement material 44 over the two longitudinal cables 52 and 54 in whatever pattern is desired, such pattern could take the form of a spiral or interwoven braid. The cables 52 and 54 are next moved over the hooks 47 and 49 of the closure clasp catch 46 and closure receiver 48 respectively. The hose reinforcement material 44 was placed over the cables 52 and 54 under tension and when these cables are located over the hooks 47 and 49, there may be imparted additional tension to the hose reinforcement materials. Tension is created upon the hose reinforcing materials 44 by now holding apart the two pieces of the closure mechanisms 46 and 48. This tension is maintained while the tie gum material 45 is next added, and all other added remaining tie gum materials are finally cured during the last step, the step of vulcanizing the removable hose covering.

It is entirely possible that the transverse wrapping of cables 52 and 54 by hose reinforcing materials 44 could be accomplished at a distance from the assembly line shown and the wrapped cables 52 and 54 introduced to the assembly line at the point where materials 44 presently joins cables 52 and 54. In such case, cables 52 and 54 would just be slipped over the closure mechanism hooks 47 and 49.

Following the application of the hose reinforcement material 44, tie gum layer 45 is laid on top of the hose reinforcement material utilizing separate tie gum applicator 74. It will probably be most likely required that there be a rolling of the tie gum layer 45 through and around the strands of the hose reinforcement material 44 to join tie gum 43. Such may be accomplished by rollers 72. Following the application of tie gum material 45 and the rolling thereof, additional tie gum layers (not shown) may be laid upon the already existing layers of tie gum as desired. Lastly, hose covering material 50, stored upon reel 46, is laid atop the tie gum layer 43 which, if the removable hose cover is fabricated upside-down as earlier suggested, would be applied to the bottom portion of the hose covering during assembly and is so shown in FIG. 6. This covering serves to protect the outside of the removable hose covering 40 from the environment, its associated abrasion, and damage.

At this point, the removable hose covering 40 is now in condition for final curing, called vulcanization, of the tie gum or other elastomeric materials. To accomplish same, a press 84 is utilized, the press comprising rather large flat faces or, if the outside of the removable hose covering 40 is to be corrugated, corrugations in one face which press down upon the fabricated hose covering 40 and, simultaneously apply pressure and heat to the hose covering to cure the elastomeric materials. Both faces of the press which engage both sides of the removable hose covering 40 may be heated, or only one face may be heated, and in which case, the heat from the heated face must pass completely through the removable hose covering to effect a complete curing.

It may be necessary to prepare the top and bottom of removable hose covering 40 with a nylon cover prior to vulcanization, which cover is retained during the process of vulcanization, but removed thereafter.

Upon curing, the hose materials bind all the components of the invention into a solid, but flexible mass.

As earlier mentioned, it will be necessary to apply pressure through the press 84 to both sides of the removable hose covering 40 during the vulcanization process to reduce swelling caused by expanding entrapped air bubbles. All through the fabrication operation, the closure mechanisms are held apart under tension, including during vulcanization in order that the hose reinforcement material 44 is maintained under tension.

Following the vulcanization, the nylon cover is stripped and the removable hose covering 40 is wound on takeup reel 82 which is held in a position such that the necessary stress on the longitudinal cables 42 earlier discussed is maintained throughout the operation. While means to apply tension to all parts of the invention requiring same have not been shown, it is realized that the methods are well known in the art, for example, may be accomplished by placing a drive on take-up reel 82 and restraints on all unloading reels.

Two finishes are shon in the top of the removable hose covering in FIG. 3, namely that hose covering 50 having an outer flat surface as shown in the left hand of FIG. 3, or the hose covering 50 surface having a corrugated shaped covering where the additional upward waves of material 43 are covering the longitudinal cables 42. The outward surface of both embodiments are made similarily, however, the smooth surface has extra tie gum material added covering the longitudinal cables and then the material placed under pressure to distribute it evenly over the whole surface. Less tie gum material may be utilized in the embodiment shown in the right half of FIG. 3, i.e., the portion having the corrugated or rippled top.

It is obvious that because the removable hose covering, when emplaced, will possess a different inner and outer diameter, the under portion of the removable hose covering will compress while the outer surface of the removable hose covering will stretch. Obviously the corrugated shaped portion of the removable hose covering in the right hand side of FIG. 3 will be easier to emplace over the inner hose 10 as it offers less resistance to transverse stretching.

It is realized that many embodiments of the high tensile strength removable hose covering may be constructed, for example, FIG. 7 illustrates a cross-sectional view of a removable hose covering absent the longitudinal high tensile strength cables wherein this embodiment closely approximates usual hose construction in its most common form wherein protection is offered in hoop strength, i.e., resistance against hose bursting, in abrasion resistance, and resistance to environment by alternate layers of transverse hose reinforcement material 56 passing from side to side between the closure mechanisms on opposite sides, alternating between layers of tie gum 59. As in the removable hose covering shown in FIG. 3, outer hose covering layer 58 shown in FIG. 7 is applied to the outside of the removable hose covering for protection against the environment, abrasion, and the like. It is realized of course that this hose covering layer 58 may be placed on both sides of the alternate removable hose covering 60.

Thus it is apparent from the fabrication of the removable hose covering above described that with the inclusion of steel or other hard material high tensile strength longitudinal cables, the subject invention, in additon to providing high tensile strength in the longitudinal direction, does provide extremely high resistance to abrasion by virtue of the fact that almost immediately under the outer hose covering are located the longitudinal steel cables and, if there are a large plurality of longitudinal cables, closely but evenly spaced, the hose covering will abraid down to the outside surface of these cables at which time the cables begin to serve as the abrasion-resistant element.

To use the subject invention, the removable hose covering is first wrapped around the inner tube, the closure mechanism brought together into a clasped position, and then the ends of the removable hose covering secured. It may be helpful to inflate the inner tube under a slight pressure immediately prior to engage opposite sides of the closure mechanism.

It is conceivable that high hoop strength is not required in the removable hose covering and in such case it is feasible to lay the hose reinforcement materials from each side of the closure mechanism without having a physical attachment of the hose reinforcement material to the closure mechanism. One embodiment may include a lip formed on the closure mechanism which would receive the hose reinforcement material laying on the lip, and then encompassed with the hose material layer wherein the bonding of the hose material layer by curing would provide necessary attachment of the hose reinforcing materials to the closure mechanisms. Additionally, it is possible to place eyelets onto the closure mechanisms in place of fingers 57 or 58 whereupon the hose reinforcement materials may traverse from side to side passing through the eyelets.

Further, in the event that the hoop strength is built into the inner tube, it may not be necessary for hose reinforcement materials to be placed in the removable hose covering, or that only minimal reinforcing materials be included in the removable hose covering.

Lastly it may also be possible to replace the lockable portions of the closure mechanisms, namely the catch and receiver 48 and 46 with eyelets, whereupon, when the removable hose covering is utilized encompassing the inner hose, a pin would pass through the eyelets of the closure mechanism. Obviously the closure mechanism eyelets would have to be staggered so they do not interfere with each other.

While a preferred embodiment and one alternate embodiment of the invention has been shown and described, it will be appreciated that there is no intent to limit the invention by such disclosure as it is apparent that various other embodiments such as different designs of closures may be utilized. Accordingly, the disclosure is intended to cover all modifications and alternate embodiments falling within the spirit and the scope of the invention as defined in the appended Claims.

I claim:

1. A high tensile strength removable hose covering for surrounding and protecting an inner hose and to impart high tensile strength in the longitudinal direction to the combined inner hose and removable hose covering for the full length of the hose covering between hose couplings or stationary standards, the removable hose covering comprising:
   a separable closure mechanism having a lockable first part and second part;
   means connecting between said closure mechanism first part and second part; and
   a high tensile strength longitudinal member adapted to be attached to associated hose couplings or stationary standards, said high tensile strength longitudinal member operably connected to said means connecting between said first part and second part of said closure mechanism.

2. The high tensile strength removable hose covering as defined in claim 1 wherein said means connecting between said closure mechanism first part and second part includes a hose material layer, hose reinforcement, and a hose cover.

3. The high tensile strength removable hose covering as defined in claim 2 wherein said separable closure mechanism first part and second part include means adapted to engage and secure said hose reinforcement whereby said hose reinforcement supplies hoop strength to the removable hose covering.

4. The high tensile strength removable hose covering as defined in claim 3 wherein said separable closure mechanism first part and second part includes protruding fingers adapted to engage and secure said hose reinforcement.

5. The high tensile strength removable hose covering as defined in claim 4 wherein said means connecting between said closure mechanism first part and second part includes alternate layers of hose material layers and hose reinforcement.

6. The high tensile strength removable hose covering as defined in claim 2 wherein said high tensile strength longitudinal member includes at least one longitudinal high tensile strength cable for the full length of the hose covering.

7. The high tensile strength removable hose covering as defined in claim 6 wherein said high tensile strength longitudinal member includes a plurality of longitudinal high tensile strength cables for the full length of the hose covering.

8. The high tensile strength removable hose covering as defined in claim 7 wherein said high tensile strength member includes cables chosen from the group consisting of steel, stainless steel, Kevlar, and nylon.

9. The high tensile strength removable hose covering as defined in claim 7 wherein said hose material layer comprises material chosen from the group consisting of rubber and plastic.

10. The high tensile strength removable hose covering as defined in claim 4 wherein said hose reinforcement connecting between said first part and second part of said closure mechanism may take the form of individual strands of material forming a helix, a braid, or strands transverse to the longitudinal member.

11. The high tensile strength removable hose covering as defined in claim 2 wherein said means connecting between said closure mechanism first part and said second part additionally includes longitudinal wires operably connected to said hose reinforcement, and said separable closure mechanism first part and second part include means adapted to engage and secure said longitudinal wires.

12. The high tensile strength removable hose covering as defined in claim 11 wherein said longitudinal wires operably connected to said hose reinforcement defines a pair of spaced apart longitudinal wires, one of said longitudinal wires attached to said first part of said closure mechanism and the second of said longitudinal wires attached to said second part of said closure mechanism, and said hose reinforcement includes strands of reinforcement material, said strands looped from side to side between said longitudinal wires whereby said hose reinforcement is thereby secured to said first part and said second part of said closure mechanism.

13. The high tensile strength removable hose covering as defined in claim 2 wherein said closure mechanism first part and second part define elongated closure mechanisms extending the full length of the hose covering.

14. The high tensile strength removable hose covering as defined in claim 2 wherein said closure mechanism first part and second part define separate individual closure mechanisms juxtaposed to each other for the full length of the hose covering.

15. The high tensile strength removable hose covering as defined in claim 2 wherein said hose cover includes a corrugated cover, corrugations of said cover extending the full length of the hose covering.

16. In combination, a high tensile strength removable hose covering and inner hose comprising:
an elongated inner hose; and
an elongated removable hose covering adapted to enclose said elongated inner hose, said removable hose covering including a high tensile strength longitudinal member adapted to be attached to associated hose couplings or stationary standards and an elongated separable closure mechanism having a first and second part extending the full length of the hose covering, said high tensile strength longitudinal member operably connected to said elongated separable closure mechanism wherein said removable hose covering may be opened up along its elongated length and thereby removed said elongated inner hose.

17. The combination as defined in claim 16 wherein said elongated removable hose covering additonally includes transverse hoop strengthening means connecting said first part to said second part of said elongated closure mechanism.

18. The combination as defined in claim 16 wherein said elongated removable hose covering high tensile strength longitudinal member is operably connected to said hoop strengthening means.

19. The combination as defined in claim 18 wherein said elongated removable hose covering additionally includes a hose material layer with said high tensile strength longitudinal member and said transverse hoop strengthening means dispersed therein, and a hose cover adapted to surround said hose material layer, high tensile strength longitudinal member, and transverse hoop strengthening means.

* * * * *